(12) United States Patent
Frías Gómez et al.

(10) Patent No.: US 11,560,609 B2
(45) Date of Patent: Jan. 24, 2023

(54) METHOD OF EXTRACTING METALS FROM POLYMETALLIC SULPHIDE ORES OR CONCENTRATES

(71) Applicant: COBRE LAS CRUCES, S.A.U., Seville (ES)

(72) Inventors: Carlos Frías Gómez, Madrid (ES); Francisco Sánchez Ruíz, Seville (ES); Jorge Antonio Blanco Avilés, Seville (ES)

(73) Assignee: COBRE LAS CRUCES, S.A.U., Seville (ES)

( * ) Notice: Subject to any disclaimer, the term of this patent is extended or adjusted under 35 U.S.C. 154(b) by 395 days.

(21) Appl. No.: 16/876,070

(22) Filed: May 17, 2020

(65) Prior Publication Data

US 2020/0362435 A1   Nov. 19, 2020

(30) Foreign Application Priority Data

May 17, 2019   (ES) ................ ES201930435

(51) Int. Cl.
| | |
|---|---|
| *C22B 3/00* | (2006.01) |
| *C22B 3/08* | (2006.01) |
| *C22B 11/00* | (2006.01) |
| *C22B 15/00* | (2006.01) |
| *C22B 3/26* | (2006.01) |

(52) U.S. Cl.
CPC ............. *C22B 3/08* (2013.01); *C22B 3/26* (2021.05); *C22B 11/04* (2013.01); *C22B 13/04* (2013.01); *C22B 15/0071* (2013.01); *C22B 19/22* (2013.01)

(58) Field of Classification Search
CPC .... C22B 3/08; C22B 3/26; C22B 3/44; C22B 3/46; C22B 11/04; C22B 13/04; C22B 15/0071; C22B 19/22; C25C 1/12; C25C 1/16
See application file for complete search history.

(56) References Cited

U.S. PATENT DOCUMENTS

| | | | |
|---|---|---|---|
| 3,856,913 A | 12/1974 | McElroy et al. | |
| 3,974,253 A | 8/1976 | Snell | |
| 7,892,505 B2 | 2/2011 | McConnell | |
| 2007/0098609 A1* | 5/2007 | McConnell | ............. C01G 3/12 423/101 |
| 2013/0209335 A1 | 8/2013 | Dixon et al. | |

FOREIGN PATENT DOCUMENTS

| | | |
|---|---|---|
| AU | 7856098 A | 2/1999 |
| CA | 1166022 A | 4/1984 |
| CN | 101643857 B | 5/2011 |
| ES | 476055 A1 | 11/1979 |
| ES | 8607418 A1 | 5/1986 |
| ES | 2137871 B1 | 8/2000 |
| JP | 2013209335 A | 9/2013 |
| RU | 2079561 C1 | 5/1997 |
| WO | WO2015178752 A1 | 6/2014 |
| WO | WO2015044353 A1 | 4/2015 |

* cited by examiner

*Primary Examiner* — Steven J Bos
(74) *Attorney, Agent, or Firm* — Equip LG; Christopher Quan (57) ABSTRACT

A method of extracting metals from polymetallic sulphide ores or concentrates comprising at least Cu, Zn, Pb and Ag, comprising a first step of atmospheric leaching in sulphate medium in the presence of recycled silver for extracting Cu and Zn and a second step of atmospheric leaching in chloride medium for extracting Pb and Ag.

12 Claims, 2 Drawing Sheets

METHOD OF EXTRACTING METALS FROM POLYMETALLIC SULPHIDE ORES OR CONCENTRATES

CROSS-REFERENCE TO RELATED APPLICATIONS

This application claims the benefit and priority of Spanish Patent Application No. P201930435, filed on May 17, 2019, the contents of which is hereby incorporated by reference in its entirety.

FIELD OF THE INVENTION

A method of extracting metals by hydrometallurgy from ores or polymetallic sulphide concentrates containing several base metals and precious metals, and comprising at least Cu as chalcopyrite, Zn, Pb and Ag and comprising a first leaching step at atmospheric pressure in a sulphate medium and in the presence of silver in an amount suitable for catalyzing the leaching of copper and zinc, and a second leaching step at atmospheric pressure and in a chloride medium, wherein lead and silver are leached; these four metals then being recovered separately as high-value products.

GOVERNMENT FUNDING NOTICE

The project leading to this application has received funding from the European Union's Horizon-2020 research and innovation programme under Grant Agreement No. 689515.

BACKGROUND OF THE INVENTION

There are many copper, zinc or lead smelters or refineries in the world that treat Cu, Zn or Pb sulphide concentrates individually; they can be said to be "mono-metallic" type refineries. There are also ISF type smelters ("Imperial Smelting Furnace") that jointly treat Zn and Pb sulphide concentrates. However, there is no industrial "poly-metal" type refined product to date capable of treating polymetallic concentrates containing together copper, zinc and lead sulphides in an overall concentrate of Cu, Zn and Pb, also containing silver, i.e., containing such four metals Cu, Zn, Pb and Ag, for their joint recovery in the same starting material. Actually, one of the objects of this invention is to promote the concept of a "poly-metal" refinery capable of treating overall concentrates and recovering in the same refinery the four metals mentioned above. Additionally, other minority metals could also be recovered.

Extracting metals from ores or polymetallic concentrates is difficult and complex because it requires efficient and viable separation and recovery of several metals in an integrated in-situ process, therefore obtaining high-value refined metals from these polymetallic starting materials requires an efficient combination of many process steps, which is very complicated and costly because there are typically used reactors operating at high pressures and temperatures, particularly when the copper is in the form of chalcopyrite.

The Spanish patent document with publication number ES0476055A1 describes the extraction of Cu, Pb, Zn, Ag and Au from complex sulphide minerals (containing chalcopyrite), by means of a method comprising a pressure reactor with oxygen, operating at 200° C., all the metallic sulphides being oxidized to sulphates, the various metals being subsequently recovered separately.

Likewise, the Spanish patent document with publication number ES8607418A1 describes the extraction of Cu and Zn and the recovery of Pb and/or precious metals from zinc-bearing sulphide materials, by means of a two-step leaching process, the first being operated in a pressurized reactor at a temperature of 120-160° C., and the second at a temperature below its boiling point and under atmospheric pressure conditions.

Also, the Spanish patent document with publication number ES2137871A1 describes the extraction of Cu, Pb, Zn and Ag from polymetallic sulphide ores from iron and other non-ferrous metals, and especially, from pyrite-based ores containing minor amounts of Cu sulphides (such as chalcopyrite), and Zn, Pb and Ag, by means of a hydrometallurgical method combining oxidation operations in an aqueous medium with oxygen in a pressurized reactor and a temperature of 220° C.

U.S. Pat. No. 3,856,913A proposes a method for bioleaching in stirred tanks with aeration of ores or concentrates containing chalcopyrite in a sulphuric acid medium wherein a soluble silver salt of the nitrate, sulphate or chloride type is added in a proportion exceeding 200 mg Ag(I) per kg of ore or concentrate. Also, patent number AU7856098A proposes a method for bioleaching ore piles containing chalcopyrite with a previous step of agglomerating the ore by adding an acid solution containing a silver salt in a proportion of 10-500 mg Ag(I) per kg of ore.

Similarly, Japanese patent document JP2013173962A describes a method for leaching chalcopyrite concentrates by bringing said concentrate into contact in an stirred tank at a temperature below 80° C. with agglomerated particles of silver sulphide or silver chloride much larger than the concentrate and being prepared by pressing said silver salts into a pellet; the leached pulp then being screened and the silver agglomerates recovered and recycled to the leach. In any case, there is a loss of a certain amount of silver due to wear or abrasion of the agglomerates mentioned above.

US patent US2013209335A1 proposes a method of recovering copper from chalcopyrite concentrates by bringing the concentrate in contact in an stirred reactor with another pyrite concentrate previously conditioned by adding silver salts in a ratio greater than 50 mg Ag(I) per kg of concentrate; at the outlet of the reactor the pyrite being separated from the leached pulp by a gravimetric method and recycled back to the leach. In this case, some of the silver attached to the pyrite concentrate may be lost due to abrasion and because some of the pyrite concentrate will not be recoverable.

After the leaching step, in order to retrieve and recover integrally the different metals such as Cu, Zn, Pb and Ag contained in the ores or polymetallic sulphide concentrates, it is required an ideal combination of different techniques and, on the other hand, there must be used different chemical means such as sulphate medium, chloride medium, etc.

In relation to the above, patent document number ES0476055A1 describes a method of recovering by solvent extraction and electrolysis dissolved copper and zinc after pressure leaching in an autoclave, while lead and precious metals are put in solution in a concentrated chloride medium and then recovered by cementing with zinc.

A patent document with publication number WO2015044353 describes the atmospheric leaching of a metallurgical waste containing silver and lead in the presence of chlorides with an oxidizing agent, then being added a carbonate salt and lead and silver being recovered as a carbonate concentrate.

On the other hand, patent number WO2015178752A1 proposes recovering lead and precious metals from secondary starting materials by leaching into a sodium sulphide rich solution converting the lead sulphate into a lead sulphide concentrate admixed with silver and gold.

It may be understood that treating polymetallic sulphide ores or concentrates so as to recover in situ several metals such as Cu, Pb, Zn and Ag efficiently and obtaining high purity products is still a challenge for the metallurgical industry that needs to be developed due to the fact that such complex polymetallic raw materials are increasingly abundant in nature, once the best quality mineral deposits are gradually exhausted. The in-situ treating of polymetallic minerals has other advantages, including environmental ones, as it is not required to produce and transport metal concentrates to be treated in refineries located at long distances from the mine where the concentrates are obtained.

SUMMARY OF THE INVENTION

As mentioned above, there are different methods for treating overall concentrates containing several metals for recovery (including copper in the form of chalcopyrite) based on the use of high-pressure reactors (autoclaves) and having certain limitations: on one hand, the investment and operating costs are very high and, on the other hand, a huge amount of gypsum is generated due to the complete oxidation of the sulphides to sulphates. However, no method has been proposed which would make it possible to treat overall concentrates, containing mostly copper as chalcopyrite, working at atmospheric pressure, thus avoiding the limitations of pressurized reactors; such new method capable of effectively treating overall concentrates containing Cu as chalcopyrite and Zn, Pb and Ag as sulfides at atmospheric pressure and with low investment and operating costs and minimal oxidation of the sulfides is one of the objects of the present invention.

There are also described above methods operating at atmospheric pressure so as to benefit copper concentrates in the form of chalcopyrite by adding silver salts acting as a catalyst to leach the chalcopyrite; however, the catalytic effect of silver has not so far been applied to overall or polymetallic concentrates containing Cu as chalcopyrite and Zn, Pb and Ag as sulfides, whose individual behavior may be different for each of these metals, being another object of the present invention to define how the catalytic effect of silver may be used to optimize the leaching of both copper and zinc.

Methods based on the extraction of copper (in the form of chalcopyrite) adding a silver catalyst have probably had no industrial application so far due to economic factors, as there may be significant losses of silver that would not be recovered. The present invention solves that inconvenience, since the proposed hydrometallurgical method allows the integral recovery of the four metals Cu, Zn, Ag and Pb.

Thus, the problem solved by the present invention is the retrieving and recovery of Cu, Zn, Pb and Ag present in the minerals or concentrates of polymetallic sulfides substantially improving the existing methods of high pressure leaching in autoclaves which are complex and costly; in that sense, a leaching at atmospheric pressure catalyzed with silver is proposed, which is fully recovered and can be recycled to the method itself.

Another purpose of the present invention is to provide a hydrometallurgical method allowing the recovery of the metals copper, zinc and lead as refined high-purity metals, and silver as a metallic product (in the form of silver cement) of high commercial value.

The use of the silver catalyst increases the extraction of the sum of Cu and Zn.

Other purpose of the present invention is allowing important savings and making this new hydrometallurgical method more attractive economically; on one hand, a fraction of the silver cement produced, showing optimal catalytic properties, can be recycled in an ideal quantity to catalyze the leaching of copper and zinc; on the other hand, a part of the lead produced can also be recycled to cement the silver.

Other purposes and advantages of the present invention are shown and will be understood from the following description and from the figures and examples presented below for illustrative and not limitative purposes only.

Therefore, a first aspect of the invention refers to a method of extracting metals from ores or polymetallic concentrates, comprising Cu-sulphides in the form of chalcopyrite and Zn, Pb and Ag-sulphides, comprising the steps of (a) a first leaching step at atmospheric pressure in sulphate medium of the initial starting material: ores comprising Cu sulphides, in the form of chalcopyrite, and Zn, Pb and Ag sulphides or polymetallic concentrates comprising Cu sulphides in the form of chalcopyrite, and Zn, Pb and Ag sulphides, in the presence of oxygen and ferric sulphate, adding sulphuric acid and a silver catalyst to obtain a solution rich in Cu and Zn and a leached solid containing Pb and Ag as sulphates;

(b) separating the solution rich in Cu and Zn and the leached solid containing Pb and the Ag from step (a) above, in the form of the leached residue of precipitated Ag and Pb sulphates;

(c) extracting Cu by adding a copper-specific organic extractant to the solution rich in Cu and Zn, to obtain a purified and charged Cu solution and a depleted refined product containing Zn;

(d) Obtaining Cu by electrodeposition from the purified and charged Cu solution obtained in step (c);

(e) removing Fe present in the spent refined product from step (c) above by precipitation through oxidation of Fe(II) to Fe(III) and adjustment of pH between 3 and 4, obtaining a solution that is Zn-charged and free of iron and an iron precipitate, part of the iron precipitate being recycled to step (a) of leaching to provide and maintain the required Fe(III) concentration;

(f) purification and concentration of the Zn-charged and iron-free solution of step (e) by adding a zinc-specific organic extractant to the Zn-charged solution to obtain a purified and Zn-charged solution and a refined product containing residual zinc being recycled to step (a) above;

(g) obtaining Zn by electrodeposition from the purified and charged Zn solution;

(h) a second step of atmospheric leaching of the leached waste comprising Pb and Ag from step (b) in a solution of a chlorine salt in saturated water at a temperature of between 60° C. and 100° C., resulting in a solution charged with Ag and Pb;

(j) recovering Ag, from the Ag and Pb charged solution by reducing it with lead metal, being recycled from step (k) below, to form an Ag cement and a Pb-enriched solution; part of the silver cement produced being recycled as a catalyst to step (a);

(k) recovering Pb from the Pb-enriched solution by chemical reduction adding metallic aluminium to form a lead cement and a spent solution being recycled to step (h) of this method; part of the lead produced being recycled to step (j) to cement the silver.

BRIEF DESCRIPTION OF THE DRAWINGS

For a better understanding of what has been set forth, some drawings are included wherein, schematically and only as a non-limitative example, a practical case of realization is represented.

DETAILED DESCRIPTION OF THE INVENTION

As said above a first aspect of the invention refers to a method of extracting metals from ores or polymetallic concentrates, comprising Cu sulphides in the form of chalcopyrite and Zn, Pb and Ag sulphides, comprising the steps of (a) a first leaching step at atmospheric pressure in sulphate medium of the initial starting material: ores comprising Cu sulphides, in the form of chalcopyrite, and Zn, Pb and Ag sulphides or polymetallic concentrates comprising Cu sulphides in the form of chalcopyrite, and Zn, Pb and Ag sulphides, in the presence of oxygen and ferric sulphate, adding sulphuric acid and a silver catalyst to obtain a solution rich in Cu and Zn and a leached solid containing Pb and Ag as sulphates;

(b) separating the solution rich in Cu and Zn and the leached solid containing Pb and the Ag from step (a) above, in the form of the leached residue of precipitated Ag and Pb sulphates;

(c) extracting Cu by adding a copper-specific organic extractant to the solution rich in Cu and Zn, to obtain a purified and charged Cu solution and a depleted refined product containing Zn;

(d) obtaining Cu by electrodeposition from the purified and charged Cu solution obtained in step (c);

(e) removing Fe present in the spent refined product from step (c) above by precipitation through oxidation of Fe(II) to Fe(III) and adjustment of pH between 3 and 4, obtaining a solution that is Zn-charged and free of iron and an iron precipitate, part of the iron precipitate being recycled to step (a) of leaching to provide and maintain the required Fe(III) concentration;

(f) purification and concentration of the Zn-charged and iron-free solution of step (e) by adding a zinc-specific organic extractant to the Zn-charged solution to obtain a purified and Zn-charged solution and a refined product containing residual zinc being recycled to step (a) above;

(g) obtaining Zn by electrodeposition from the purified and charged Zn solution;

(h) a second step of atmospheric leaching of the leached waste comprising Pb and Ag from step (b) in a solution of a chlorine salt in saturated water at a temperature of between 60° C. and 100° C., resulting in a solution charged with Ag and Pb (j) recovering Ag, from the Ag and Pb charged solution by reducing it with lead metal, being recycled from step (k) below, to form an Ag cement and a Pb-enriched solution; part of the silver cement produced being recycled as a catalyst to step (a);

(k) recovering Pb from the Pb-enriched solution by chemical reduction adding metallic aluminium to form a lead cement and a spent solution being recycled to step (h) of this method; part of the lead produced being recycled to step (j) to cement the silver.

The silver is recycled from the method itself, therefore no autoclave is required and only a controlled portion of the sulfides is oxidized to sulfate, the rest being remained as elemental sulfur, and it is also feasible to recover and recycle 100% of the silver used as a catalyst.

In the present invention the term "silver cement" refers to a product obtained by chemical reduction of silver from the solution rich in Pb and Ag of step h) with a metal of greater oxidation potential than silver (M1), so that silver is deposited on the metal, added in some excess, and a metallic product is formed containing Ag(0) and some residual portion of the other metal Ml. Therefore, silver cement is a metallic product consisting basically of Ag(0) and a metal with a higher oxidation potential than silver.

In the present invention the term "lead cement" refers to a product obtained by chemical reduction of lead from the Pb-enriched solution of step (i) with a metal of higher oxidation potential than lead (M1), so that lead is deposited on the metal, added in some excess, and a metallic product is formed containing Pb(0) and some residual portion of the other metal M1. Therefore, lead cement is basically a metallic product consisting of Pb(0) and a metal of higher oxidation potential than lead.

In the present invention the term "specific organic extractant for Cu" refers to a reagent whose main characteristic is its high selectivity for extracting Cu in step c). In particular, the Cu-specific organic extractant is selected from hydroxioximes, ketoximes, aldoximes and mixtures thereof.

In the present invention the term "specific organic extractant for Zn" refers to a reagent whose main characteristic is its high selectivity for extracting Zn at step f). In a particular case the specific organic extractant for Zn is an organophosphoric acid.

The extraction with Cu and Zn solvents is carried out by liquid-liquid contact between the aqueous solution containing these metals and a specific organic solvent. It is an ion exchange method, passing protons from the organic phase to the aqueous phase and the Cu(II) or Zn(II) ion from the aqueous phase to the organic phase in a selective way according to the conditions in which these methods are carried out. The solvent extraction techniques comprise two main objectives, purifying and concentrating the Cu or Zn in preparation for the respective electrodeposition steps (d) and (g) of these metals.

In the present invention the term "polymetallic sulphide ores or concentrates" refers to mineral starting materials which are mainly composed of iron sulphide (pyrite), copper sulphides (chalcopyrite, chalcocite, covellina, etc.), zinc sulphide (blende or sphalerite) and lead sulphide (galena) together with other minor elements such as Ag, Au, etc.

In the present invention the term "enriched air" refers to enriched air having between 30% and 80% oxygen, generally obtained by simple mechanical equipment, by means of filtration of the air by membranes.

Preferably in the method of the invention step a) is performed in two successive sub-steps, the first sub-step without adding the silver catalyst and the second sub-step by adding the silver catalyst, maintaining the other conditions as already described for step a). With this step a more efficient leaching of the sum of the two metals Cu and Zn is achieved as can be seen in example 2 below.

Preferably in step (a), chloride ions are added in the form of salt until reaching a concentration greater than 0.4 g/l of chloride ions in the leach solution, particularly sodium chloride. As can be seen in example 3 the addition of chloride ions along with the silver catalyst increases the leaching of zinc.

Preferred embodiments of the step a) of atmospheric leaching in a sulfate medium of the raw material are as follows:

the particle size of the raw material is equal to or less than the degree of release required for Cu, Zn, Pb and Ag sulphide mineral species. Preferably, this size is between 10 and 100 microns;

Preferably, the leaching step (a) is carried out in a leaching reactor. The temperature of the leaching reactors is between 80° C. and 100° C. The holding time in the leaching reactors is between 6 hours and 24 hours.

The added sulphuric acid is in the range of 20 g/l to 100 g/l

The concentration of Fe(III) ion present as ferric sulphate is in the range of 5 g/l to 50 g/l.

Oxygen is injected into the bottom of the reactors at a pressure of 6 bar.

The dose of silver depends on the nature and mineralogy of the mineral raw materials. For the treated raw materials, it is required to add silver in a proportion usually ranging between 250 and 1000 grams of Ag per ton of solid starting material.

In a preferred embodiment of step b) of solid/liquid separation, the pulp leaving step a) is cooled in pulp cooling towers, and then the cold pulp enters a thickener wherein the two streams are separated. Through the overflow, the solution rich in Cu and Zn flows to the next step, while the leached residue containing Pb and Ag is extracted from the bottom and sent to filtration and washing, recovering in filtered liquor, that is returned to the thickener.

In preferred embodiments of the steps (c) and (d) of selective extraction of copper with organic solvent and its electrodeposition:

The organic extractant is a mixture of aldoxime and ketoxime.

The operating temperature is in the range of 35° C. to 40° C.

The copper solvent extraction circuit consists in three in-line method steps: extraction, washing and stripping. During extraction, the organic extractant is brought into contact with the Cu- and Zn-rich solution to obtain a copper-charged organic phase and a copper-poor, sulphuric acid-enriched aqueous solution, called aqueous refining, which is then passed on to the next step.

The organic phase is then washed wherein it is contacted with water at an acidic pH and certain impurities are removed, such as iron, chlorides, etc.

The washed organic phase goes to copper stripping and it is contacted with an acid solution (depleted electrolyte) from copper electrolysis to obtain a copper impoverished organic phase which is extracted again and an aqueous solution rich in copper which moves on to copper electrodeposition.

There are produced copper cathodes of the highest purity, grade 1. Preferred embodiments of the iron removal step (e) are as follows:

The operating temperature is between 35° C. and 40° C.

The holding time in the iron neutralization and precipitation reactors may range between 2 hours and 5 hours.

As a neutralizing agent, calcium hydroxide is added until a pH of 3 to 4 is reached. Optionally, primary materials such as zinc calcines or secondary materials such as Waelz oxides can be added as alkali.

The aim of this method is to remove and precipitate as much of the dissolved iron as possible, obtaining a purified solution rich in zinc and containing less than 10 ppm Fe, which moves on to the next step.

It is added lime or limestone slurry or zinc oxides and it is injected air, enriched air or oxygen. In a preferred embodiment of steps (f) and (g) of selective extraction of zinc with organic solvent and its electrodeposition the procedure conditions are as follows:

The organic extractant is di(2-ethylhexyl) phosphoric acid.

The operating temperature is in the range of 35° C. to 40° C.

In particular the zinc solvent extraction circuit consists in four in-line method steps: extraction-1, extraction-2, washing and stripping. In extraction-1, the organic extractant is brought into contact with the Zn-rich solution to obtain a zinc-charged organic phase and an aqueous solution with a low zinc concentration and sulphuric acid enriched, called aqueous refining-1, which passes to the extraction-2 step once the refining-1 has been conditioned with calcium hydroxide to neutralize the sulphuric acid contained. After the extraction step-2, an organic phase more charged with zinc is obtained and an acidic aqueous solution depleted in zinc, called refining-2, is recirculated to the leaching step (a), thus closing the circuit of the Cu and Zn extraction plant.

The organic phase is then washed where it is contacted with acidified water and certain impurities are removed, such as calcium, chlorides, etc.

The washed organic phase is then re-extracted from the zinc and brought into contact with an acid solution (depleted electrolyte) from the zinc electrolysis to obtain an organic phase impoverished in zinc that is re-extracted-1 and an aqueous solution rich in zinc that is then electrodeposited with zinc.

There are produced zinc cathodes of the highest purity, suitable for obtaining commercial SHG quality zinc ingots.

In preferred embodiments of step h) the atmospheric leaching in chloride medium of the solid waste arising from step b) and containing lead and silver sulphates is as follows:

Temperature of the leaching reactors is between 60° C. and 100° C.

Holding time in the leaching reactors is between 1 hour and 3 hours.

The concentration of chlorides ranges from 1.5 to 4.5 N.

The added acid can be sulphuric or hydrochloric and the required acid is added until a pH between 0.2 and 4.0 is reached.

In the treated starting materials, a leaching or dissolution efficiency greater than 95% is achieved.

The efficiency of silver leaching or dissolution depends on the mineralogy and the silver grade in the original starting material, and also depends on the amount of silver added as a catalyst in step a). In the treated starting materials, a silver leaching or dissolution efficiency greater than 96% is achieved, with 100% of the silver added as a catalyst to step a) plus a certain percentage corresponding to the silver contained in the original starting material being recovered in any case.

In step h) there may be added other metals with a lower electrode potential than lead. In a preferred embodiment of the silver recovery step (j) by chemical reduction, metallic lead from step (l) is recycled and brought into contact with the silver-charged solution, obtaining a silver cement powder. Part of this cement is recycled in step (a). The procedure conditions are as follows:

Temperature of the silver cementing reactors is between 60° C. and 80° C.

Holding time in the silver cementing reactors is between 0.25 hour and 1 hour.

In step j) there may be added other metals with a lower electrode potential than silver.

In a preferred embodiment of the lead recovery step (k) by chemical reduction, it is used metallic aluminium which is brought into contact with the lead-charged solution, obtaining a lead cement powder. This lead powder is compacted and then melted down in step (l) to obtain lead ingots as the final product. Part of the lead produced is recycled in step (j). Preferably the procedure conditions are as follows:

Temperature of the lead cementing reactors is between 60° C. and 80° C.

Holding time in lead cementing reactors between 0.25 hour and 1 hour.

Figure 1:
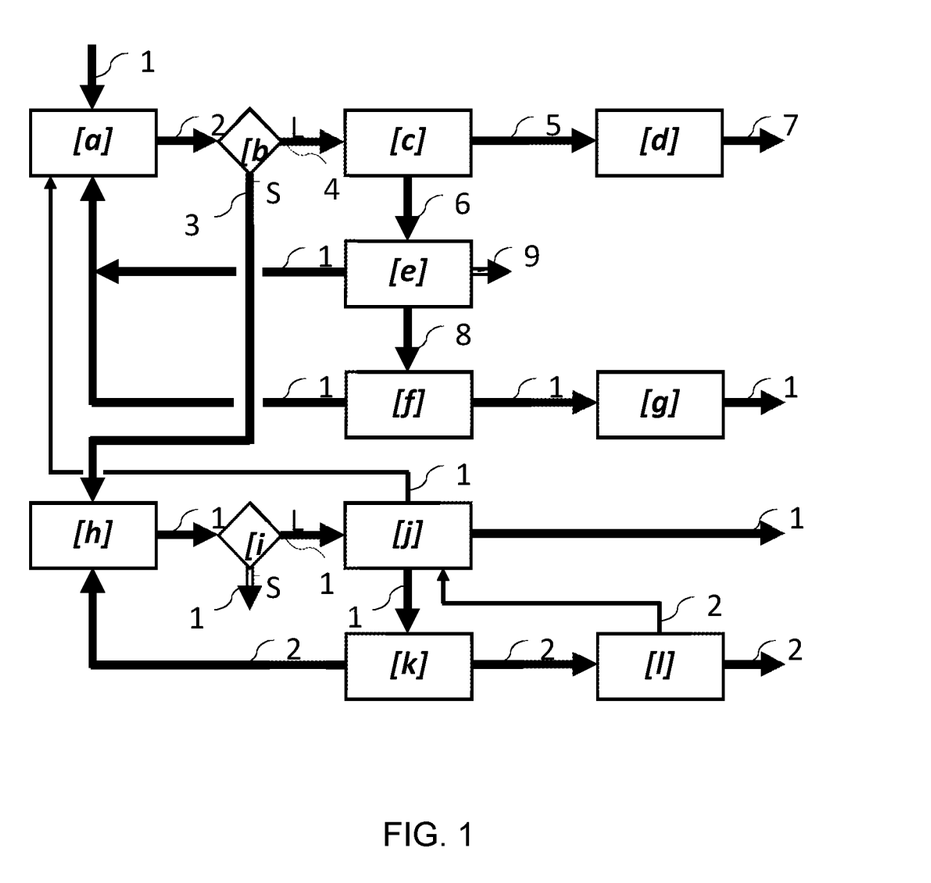
FIG. 1 is a scheme of the method of the invention including every step of the method, as described in the following section, and particularized in example 1.

Preferably the method of metal extraction proposed in the present invention from polymetallic sulphide ores or concentrates and comprising at least the metals Cu, Zn, Pb and Ag is illustrated in a simplified form in the diagram in FIG. 1 and comprises the following main steps:

Step [a]. Atmospheric Leaching in Sulphate Medium

Atmospheric leaching in a hot aqueous medium of the starting material (1) after grinding to a particle size wherein the sulphide minerals of Cu, Zn, Pb and Ag are released and accessible for chemical reaction in the presence of oxygen and adding ferric sulphate and sulphuric acid, and adding a catalyst consisting of a silver cement obtained and recycled from step [j] so as to achieve efficient leaching and obtain a solid leachate (3) that moves on to the next step within the stream (2) of leached pulp. The main reactions occurring in this step of atmospheric leaching are:

$$CuFeS_2 + 2Fe_2(SO_4)_3 = CuSO_4 + 5FeSO_4 + 2S° \quad (i)$$

$$ZnS + Fe_2(SO_4)_3 = ZnSO_4 + 2FeSO_4 + S° \quad (ii)$$

$$PbS + Fe_2(SO_4)_3 = PbSO_4(s) + 2FeSO_4 + S° \quad (iii)$$

$$Ag_2S + Fe_2(SO_4)_3 = Ag_2SO_4(s) + 2FeSO_4 + S° \quad (iv)$$

$$2FeSO_4 + 0.5O_2 + H_2SO_4 = Fe_2(SO_4)_3 + H_2O \quad (v)$$

Reactions (i) and (ii) are catalyzed by the presence of silver added as silver cement. In reactions (iii) and (iv) the lead and silver sulphates are formed in solid form and are incorporated in the stream (3). The reaction (v) takes place simultaneously with the above, with continuous regeneration of the Fe(III) sulphate required for the reactions (i) to (iv) to progress effectively.

Step [b]. Solid/Liquid Separation in the Leached Copper and Zinc Pulp

Separation of the solid leached waste (3) and of a Cu and Zn rich solution (4) using conventional thickening and filtration equipment Step [c]. Selective Extraction of Copper with Organic Solvent Selective extraction of copper from the Cu and Zn rich solution (4) by the solvent extraction technique and using a specific organic extractant (RH1), so as to obtain a purified Cu-charged aqueous solution (5) and a Zn-depleted refining (6), according to the ion exchange reaction that takes place between the aqueous and organic phases:

$$2RH1(org) + Cu^{2+} = R_2Cu + 2H^+ \quad (vi)$$

Step [d]. Electrodeposition of Copper

Obtaining copper metal in the form of high purity copper cathodes (7) by electrodeposition from the purified and charged Cu solution (5), according to the reactions (g) and (h) taking place at the cathode and at the anode of the copper electrolysis cells respectively:

$$CuSO_4 + 2e^- = Cu° + SO_4^{2-} \quad (vii)$$

$$H_2O - 2e^- = \frac{1}{2}O_2 + 2H^+ \quad (viii)$$

Overall reaction: $CuSO_4 + H_2O = Cu° + \frac{1}{2}O_2 + H_2SO_4$

Step [e]. Iron Removal

Removing iron present in the wasted refined product (6) by chemical precipitation, after oxidation of Fe(II) to Fe(III) with air or oxygen, adjusting the pH with an alkali such as calcium hydroxide, as shown in reaction (i), obtaining a solution charged with zinc and free of iron (8) and a solid residue with the iron salts precipitated together with the gypsum formed (9). A portion of the solid residue (10) is contacted with the zinc refining-1 (12) to re-lixiviate iron (III) and recycle it to step [a] in the form of ferric sulfate, as shown in the reaction (x).

$$Fe_2(SO_4)_3 + 3Ca(OH)_2 + 4H_2O = 2FeO(OH) + 3CaSO_4.2H_2O \quad (ix)$$

$$2FeO(OH) + 3H_2SO_4 = Fe_2(SO_4)_3 + 4H_2O$$

Step [f]. Selective Extraction of Zinc with Organic Solvent

Solvent extraction of zinc from solution (8) using a zinc-specific organic extractant (RH2) to obtain a purified, Zn-charged aqueous phase (11) and a low Zn refining-1 (12), being recycled to step [a]. The ion exchange reaction that takes place is as follows between the aqueous phase and the organic phase:

$$2RH2(org) + Zn^{2+} = R_2Zn + 2H^+ \quad (xi)$$

Step [g]. Zinc Electrodeposition

Obtaining zinc metal in the form of high purity cathodes (13) by electrodeposition from the purified and charged aqueous solution of Zn (11), according to reactions (xii) and (xiii) taking place at the cathode and at the anode of the zinc electrolysis cells respectively:

$$ZnSO_4 + 2e^- = Zn° + SO_4^{2-} \quad (xii)$$

$$H_2O - 2e^- = \frac{1}{2}O_2 + 2H^+ \quad (xiii)$$

Overall reaction: $ZnSO_4 + H_2O = Zn° + \frac{1}{2}O_2 + H_2SO_4$

Step [h]. Atmospheric Leaching in Chloride Medium

Second step of atmospheric leaching of the solid leached waste (3) from step [b], containing Pb and Ag sulphates, in a hot solution and concentrated in chlorides, such as sodium chloride, adding sulphuric or hydrochloric acid for pH adjustment and obtaining a leached pulp (14) which moves on to the next step. The main reactions that occur in this step of atmospheric lead and silver leaching are as follows:

$$PbSO_4 + 4NaCl = Na_2PbCl_4 + Na_2SO_4 \quad (xiv)$$

$$Ag_2SO_4 + 4NaCl = 2NaAgCl_2 + Na_2SO_4 \quad (xv)$$

Step [i]. Solid/Liquid Separation in the Lead-Silver Leached Pulp

Separating the solid leachate (15) and a solution rich in Pb and Ag (16) using conventional thickening and filtration equipment.

Step [j]. Silver Recovery

Recovering silver from solution (16) by chemical reduction with a metal of higher oxidation potential than silver (MO such as lead (other metals including iron, zinc or aluminium may be used), as shown in reactions (xvi) and (xvii), so as to obtain a metallic Ag product: silver cement (17), and a Pb-enriched and Ag-free solution (18). A suitable portion of the silver cement is recycled to step [a] to act as a catalyst in the leaching of Cu and Zn.

$$M1^0 - xe^- = M1^{x+} \quad (xvi)$$

$$xAg^{1+} - xe^- = xAg^0 \quad (xvii)$$

Overall reaction: $M1^0 + xAg^{1+} = M1^{x+} + xAg^0$

Steps [k] and [l]. Lead Recovery

Recovering lead from the Pb-enriched solution (18) by chemical reduction with a metal of higher oxidation potential than lead (M2) such as iron, zinc or aluminium, so as to obtain a metallic lead product (20) in the form of fine particles as shown in reactions (r) and (s), and a solution depleted in Pb (21) being recycled to step [h]; to avoid the accumulation of certain components in the main circuit, a small purge is carried out in this solution. The metallic lead product (20) moves on to step l where it is compacted to form briquettes, and then melted and strained, obtaining high purity lead ingots (22) as a final product. A suitable portion of the lead produced is recycled to step j to act as a silver reducer.

$$M2^0 - \text{and } e^- = M2^{x+} \quad (r)$$

$$yPb^{2+} - \text{and } e^- = \text{and } Pb^0 \quad (s)$$

Overall reaction: $M2^0 + yPb2+ = M2^{y+} + yPb^0$

EXAMPLES

The present invention is further described by means of the following examples, not to be considered as limiting, detailing the preferred modalities.

Example 1. Atmospheric Leaching of Overall Polymetallic Concentrates in a Step Adding Silver Catalyst Several laboratory-scale, one-step atmospheric leaching tests were performed using one-liter glass reactors with magnetic stirrers on two samples of overall polymetallic concentrates from different sources, called Concentrate A and Concentrate B, so as to test the effect of adding silver as a catalyst. The composition of the concentrates and the operating conditions are shown in the following tables.

TABLE 1

Composition of the concentrates

| Overall concentrate | Cu, % | Zn, % | Pb, % | Ag, ppm | Fe, % | S, % |
|---|---|---|---|---|---|---|
| A | 3.6 | 4.6 | 1.6 | 45 | 33 | 40 |
| B | 1.9 | 4.8 | 2.0 | 43 | 34 | 42 |

TABLE 2

Operating conditions in example 1

| Parameter | Value |
|---|---|
| Temperature, °C. | 90 |
| Reaction time, h | 16 |

TABLE 2-continued

Operating conditions in example 1

| Parameter | Value |
|---|---|
| Concentrate, g | 28 |
| Water, ml | 348 |
| Dissolution Fe2(SO4)$_3$-200 g/l, ml | 124 |
| Sulfuric acid-98%, ml | 13 |
| Silver catalyst Ag$_2$SO$_4$, g | 0.081 |

Copper and zinc are present in the form of metal sulfides, chalcopyrite and blende, respectively, in the treated overall concentrate samples and are leached according to reactions (a) and (b) and passed into solution. The leaching efficiency has been calculated as the percentage of each of these metals that have dissolved during the leaching process regarding the content of such metals in the initial weight of concentrate fed; the percentages of copper and zinc extraction are summarized below:

TABLE 3

Percentages of copper and zinc extraction in example 1

| | Silver addition: No | | Silver addition: Yes | |
|---|---|---|---|---|
| Overall concentrate | Cu, % | Zn, % | Cu, % | Zn, % |
| A | 54.8 | 98.7 | 97.8 | 93.9 |
| B | 55.6 | 96.9 | 96.6 | 82.6 |

As it can be seen the addition of silver catalyst significantly increases copper leaching from chalcopyrite, at the same time reducing zinc leaching, this effect being more negative in the case of Concentrate B which goes from recovering 96.9% zinc without adding silver catalyst to recovering 82.6% zinc in the presence of silver.

Example 2. Atmospheric Leaching of Overall Polymetallic Concentrates in Two Steps Adding Silver Catalyst Since the addition of silver as a catalyst can decrease zinc extraction during the atmospheric leaching of the overall polymetallic concentrates, in this example the two-step atmospheric leaching process of concentrate B was performed, the first without adding silver, and the second adding silver. The laboratory equipment used was the same as in the previous example, i.e., one-liter capacity glass reactors equipped with a magnetic stirrer. The operating conditions are as follows:

TABLE 4

Operating conditions of example 2

| Parameter | Value Step 1 | Value Step 2 |
|---|---|---|
| Temperature, °C. | 90 | 90 |
| Reaction time, h | 8 | 8 |
| Concentrate, g | 28 | 28 |
| Water, ml | 348 | 348 |
| Dissolution Fe2(SO4)$_3$-200 g/l, ml | 124 | 124 |
| Sulfuric acid-98%, ml | 13 | 13 |
| Silver catalyst Ag$_2$SO$_4$, g | 0 | 0.081 |

Copper and zinc are present in the form of metal sulfides, chalcopyrite and blende, respectively, in the treated overall concentrate samples and are leached according to reactions (a) and (b) and passed into solution. The leaching efficiency has been calculated as the percentage of each of these metals that have dissolved during the leaching process relative to the content of such metals in the initial weight of concentrate fed; the percentages of copper and zinc extraction are summarized below:

TABLE 5

Extraction percentages of copper and zinc from example 2

|  | Step 1 No silver added | | Step 2 Silver added | |
| --- | --- | --- | --- | --- |
| Overall concentrate | Cu, % | Zn, % | Cu, % | Zn, % |
| B | 55.6 | 96.9 | 94.0 | 97.0 |

As it can be seen when the atmospheric leaching is carried on in two steps, the first one without adding silver, and the second one adding silver as a catalyst, an efficient leaching of both metals, copper and zinc, is achieved in the checked overall concentrates.

Figure 2:
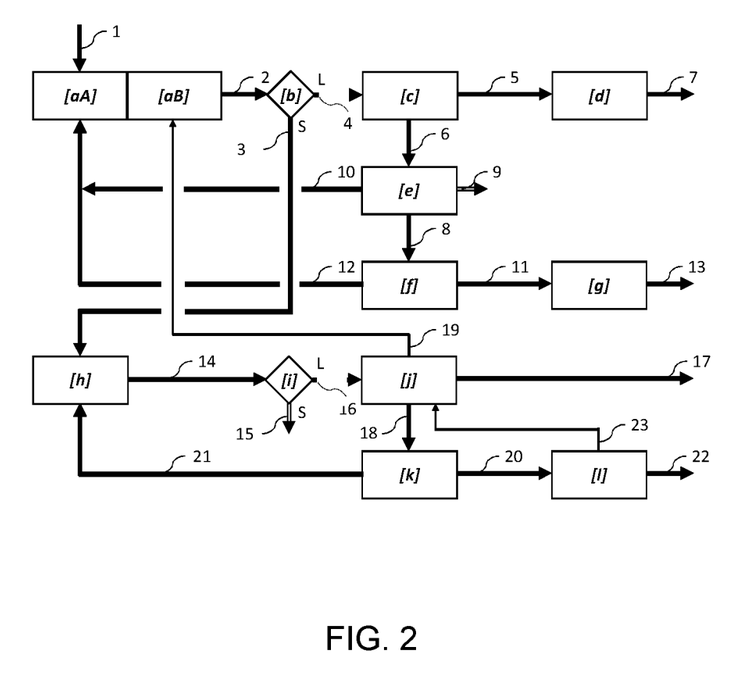
FIG. 2 is another scheme of the method of the invention including every step of the method, and particularized in example 2.

The above results allow the definition of two different flow diagrams to achieve an efficient atmospheric leaching of overall polymetallic concentrates, depending on their behavior against the addition of silver as a catalyst. FIG. 1 illustrates atmospheric leaching in a single step, adding the silver catalyst at the beginning of the leaching process; this diagram is applicable to polymetallic concentrates where both copper and zinc are leached efficiently by the catalytic effect of the added silver. FIG. 2 illustrates two-step leaching, with the first step of the atmospheric leaching process occurring without adding silver catalyst, and the second step of leaching occurring after the addition of silver catalyst; this diagram is applicable to polymetallic concentrates where the silver catalyst produces a reduction in the zinc leaching efficiency, so that in the first step a high zinc extraction is achieved without the presence of the silver catalyst, while in the second leaching step, once said catalyst is added, copper is efficiently extracted from the chalcopyrite.

Example 3. Atmospheric Leaching of Overall Polymetallic Concentrates Aadding Chlorides Along with the Silver Catalyst Several atmospheric leaching tests were performed in a single step at laboratory scale, using the same equipment mentioned in the previous examples, one-liter capacity glass reactors equipped with magnetic stirrer, on two samples of polymetallic overall concentrates A and B. In some tests only the silver catalyst was added, while in other tests the silver and sodium chloride catalyst were added together. The operating conditions are as follows:

TABLE 6

Operating conditions of Example 3

| Parameter | Value |
| --- | --- |
| Temperature, ° C. | 90 |
| Reaction time, h | 16 |
| Concentrate, g | 28 |
| Water, ml | 348 |

TABLE 6-continued

Operating conditions of Example 3

| Parameter | Value |
| --- | --- |
| Dissolution $Fe_2(SO_4)_3$-200 g/l, ml | 124 |
| Sulfuric acid-98%, ml | 13 |
| Silver catalyst $Ag_2SO_4$, g | 0.081 |
| Sodium chloride, NaCl, g | 0.4 |

Copper and zinc are present in the form of metal sulfides, chalcopyrite and blende, respectively, in the treated overall concentrate samples and are leached according to reactions (a) and (b) and passed into solution. The leaching efficiency has been calculated as the percentage of each of these metals that have dissolved during the leaching process relative to the content of such metals in the initial weight of concentrate fed; the percentages of copper and zinc extraction are summarized below:

TABLE 7

Extraction percentages of copper and zinc from example 3

|  | Addition of silver catalyst | | Addition of silver catalyst together with sodium chloride | |
| --- | --- | --- | --- | --- |
| Overall concentrate | Cu, % | Zn, % | Cu, % | Zn, % |
| A | 97.8 | 93.9 | 96.3 | 97.6 |
| B | 96.6 | 82.6 | 92.7 | 95.5 |

As it can be seen the addition of the silver catalyst along with sodium chloride significantly increases zinc leaching, this effect being more noticeable in the case of Concentrate B which goes from recovering 82.6% zinc adding only the silver catalyst to recovering 95.5% zinc when the silver catalyst is added along with sodium chloride.

The above results show that it is possible to define two method options to achieve high zinc recovery from the overall polymetallic concentrates, one is performing the two-step atmospheric leaching as described in FIG. 2, and the other possibility is applying the one-step atmospheric leaching as described in FIG. 1, adding together the silver catalyst and the sodium chloride.

Example 4. Atmospheric Leaching of Overall Polymetallic Concentrates Adding Recycled Silver Cement as a Silver Catalyst Several laboratory-scale, one-step, atmospheric leaching tests were performed using three-liter glass reactors with variable speed agitators on a sample of overall polymetallic concentrate, called Concentrate C, to test the effect of adding silver in the form of recycled silver cement against a silver sulfate salt. The composition of the concentrate and operating conditions are shown in the tables below.

TABLE 8

Composition of the concentrate in example 4

| Overall concentrate | Cu, % | Zn, % | Pb, % | Ag, ppm | FeFe, % | S, % |
| --- | --- | --- | --- | --- | --- | --- |
| C | 1.8 | 5.0 | 3.8 | 110 | 37 | 46 |

TABLE 9

| Operating conditions of Example 4 | |
| --- | --- |
| Parameter | Value |
| Temperature, ° C. | 90 |
| Reaction time, h | 17 |
| Agitator, rpm | 400 |
| Concentrate, g | 500 |
| Leaching solution, ml | 2500 |
| Leaching solution composition: | |
| Sulfuric acid, g/l= | 60 |
| Fe, g/l= | 35 |

The main components of recycled silver cement are metallic lead (90%) and metallic silver (5%).

Copper and zinc are present in the concentrate in the form of metal sulfides, chalcopyrite and blende, respectively, and are leached according to reactions (a) and (b) and then dissolved. Leaching efficiency has been calculated as the percentage of each of these metals that have dissolved during the leaching process relative to the content of such metals in the initial weight of concentrate fed; the percentages of copper and zinc extraction in concentrate C are summarized below:

TABLE 10

| Extraction percentages of copper and zinc from example 4 | | | | | |
| --- | --- | --- | --- | --- | --- |
| No silver catalyst addition | | Addition of $Ag_2SO_4$ (700 g/t solid) | | Addition of recycled silver cement (150 g/t solid) | |
| Cu, % | Zn, % | Cu, % | Zn, % | Cu, % | Zn, % |
| 83.8 | 88.5 | 90.7 | 96.5 | 91.4 | 95.3 |

As it can be seen the addition of silver as a catalyst, either as a silver sulfate salt or as a recycled silver cement, substantially increases the leaching of copper and zinc in this overall concentrate as compared to the case without adding silver catalyst. It can also be seen that the addition of recycled silver cement has a catalytic effect very similar to the silver sulphate salt, even at a much lower dose: 150 g/t of solid versus 700 g/t of solid of the silver salt. Most likely, silver cement has a higher catalytic activity than the silver salt because it is formed by metallic particles of nano-crystalline size and a large specific surface.

The invention claimed is:

1. A method of extracting metals from minerals or polymetallic concentrates, comprising Cu sulphides in the form of chalcopyrite, and Zn, Pb and Ag sulphides, comprising the steps of:
   (a) a first leaching step at atmospheric pressure in sulphate medium of the initial starting material: ores comprising Cu sulphides in the form of chalcopyrite, and Zn, Pb and Ag sulphides or polymetallic concentrates comprising Cu sulphides in the form of chalcopyrite, and Zn, Pb and Ag sulphides, in the presence of oxygen and ferric sulphate, adding sulphuric acid and a silver catalyst to obtain a solution rich in Cu and Zn and a leached solid containing Pb and Ag as sulphates;
   (b) separating the solution rich in Cu and Zn and the leached solid containing Pb and Ag from step (a) above, in the form of the leached residue of Ag and Pb sulphate precipitates;
   (c) extracting Cu by adding a copper-specific organic extractant to the solution rich in Cu and Zn, to obtain a purified and charged Cu solution and a spent refined product containing Zn;
   (d) obtaining Cu by electrodeposition from the purified and charged Cu solution obtained in step (c);
   (e) removing Fe present in the spent refined product from step (c) above by precipitation through oxidation of Fe(II) to Fe(III) and adjustment of pH between 3 and 4, resulting in a Zn-charged and iron-free solution and an iron precipitate; part of the iron precipitate being recycled to step (a) to provide and maintain a Fe(III) concentration;
   (f) purification and concentration of the iron-free Zn-charged solution of step (e) by adding a zinc-specific organic extractant to the Zn-charged solution to obtain a purified Zn-charged solution and a refined product containing residual zinc being recycled to step (a) above;
   (g) obtaining Zn by electrodeposition from the purified and charged Zn solution;
   (h) a second step of atmospheric leaching of the leached waste comprising Pb and Ag from step (b) in a solution of a chlorine salt in saturated water at a temperature of 60° C. to 100° C., resulting in a solution charged with Ag and Pb;
   (j) recovering Ag from the Ag and Pb charged solution by reducing the Ag and Pb charged solution with lead metal, being recycled from step (k) below, to form an Ag cement and a Pb-enriched solution; part of the silver cement produced being recycled as a catalyst to step (a); and
   (k) recovering Pb from the Pb-enriched solution by chemical reduction adding metallic aluminium to form a lead cement and a spent solution being recycled to step (h) of this method; part of the lead produced being recycled to step (j) to cement the silver.

2. The method of extracting metals according to claim 1, characterized in that step a) is performed in two successive sub-steps, the first sub-step without adding the silver catalyst and the second sub-step adding the silver catalyst.

3. The method of extracting metals according to of claim 1, characterized in that the addition of chloride ions in the form of salt in step a) continues until reaching a concentration greater than 0.4 g/l of chloride ions in a leaching solution.

4. The method of extracting metals according to of claim 1, characterized in that in step a) the leaching time is between six hours and twenty-four hours, and the temperature is between 80° C. and 100° C.

5. The method of extracting metals according to of claim 1, characterized in that in step a) the added sulfuric acid is between 20 g/l and 100 g/l.

6. The method of extracting metals according to of claim 1, characterized in that in step a) the iron concentration is between 5 g/l and 50 g/l.

7. The method of extracting metals according to of claim 1, characterized in that in step e) of removing iron the precipitation through oxidation of Fe(II) to Fe(III) and adjustment of pH between 3 and 4 comprises adding lime or limestone slurry or zinc oxides, and injected air, enriched air or oxygen.

8. The method of extracting metals according to of claim 1, characterized in that in step h) the leaching time is between one hour and three hours, and the temperature is between 60° C. and 100° C.

9. The method of extracting metals according to of claim 1, characterized in that in step h) the pH is between 0.2 and 4.0.

10. The method of extracting metals according to of claim 1, characterized in that in step h) the concentration of chloride ions is between 1.5N and 4.5N.

11. The method of extracting metals according to of claim 1, characterized in that in step j) there is added other metals having an electrode potential lower than silver.

12. The method of extracting metals according to of claim 1, characterized in that in step h) there is added other metals having an electrode potential lower than lead.

\* \* \* \* \*